United States Patent
Magnusson

(10) Patent No.: US 8,113,397 B2
(45) Date of Patent: Feb. 14, 2012

(54) LOAD STOP FOR SUPPORTING A LOAD ON A LOAD CARRIER

(75) Inventor: Karl-Johan Magnusson, Hillerstorp (SE)

(73) Assignee: Thule Sweden AB, Hillerstorp (SE)

(*) Notice: Subject to any disclaimer, the term of this patent is extended or adjusted under 35 U.S.C. 154(b) by 0 days.

(21) Appl. No.: 12/343,312

(22) Filed: Dec. 23, 2008

(65) Prior Publication Data
US 2009/0120983 A1 May 14, 2009

Related U.S. Application Data

(63) Continuation of application No. PCT/SE2007/000613, filed on Jun. 26, 2007.

(51) Int. Cl.
*B60R 9/04* (2006.01)
(52) U.S. Cl. ........ 224/324; 224/321; 224/325; 224/549; 224/553
(58) Field of Classification Search .................. 224/281, 224/314, 320, 321, 324, 502, 531, 549, 551, 224/553, 554, 325; 410/31, 32, 42, 94, 104, 410/131; 296/37.5; 211/184
See application file for complete search history.

(56) References Cited

U.S. PATENT DOCUMENTS

| 3,579,710 | A | * | 5/1971 | Gartzke | 16/93 R |
| 3,722,910 | A | * | 3/1973 | Heckenlaible | 410/107 |
| 4,358,037 | A | * | 11/1982 | Heideman | 224/321 |
| 4,364,500 | A | * | 12/1982 | Bott | 224/325 |
| 4,460,116 | A | * | 7/1984 | Bott | 224/321 |
| 4,615,276 | A | * | 10/1986 | Garabedian | 108/61 |
| 4,875,730 | A | * | 10/1989 | Justice | 296/37.5 |
| 5,037,152 | A | * | 8/1991 | Hendricks | 296/3 |
| 5,076,479 | A | * | 12/1991 | Davison | 224/324 |
| 5,209,357 | A | * | 5/1993 | Cannon | 211/43 |
| 5,265,991 | A | * | 11/1993 | Herrick et al. | 410/69 |
| 5,516,017 | A | * | 5/1996 | Arvidsson | 224/310 |
| 2004/0134950 | A1 | * | 7/2004 | Kmita et al. | 224/321 |

* cited by examiner

*Primary Examiner* — Justin Larson
*Assistant Examiner* — Steven M Landolfi, Jr.
(74) *Attorney, Agent, or Firm* — Novak Druce + Quigg LLP

(57) ABSTRACT

A load stop (1) for supporting a load being transported on a load carrier arranged on a vehicle. The load carrier includes at least one load carrying tube (2) with at least one groove (6) for fastening the load stop on the load carrying tube. The load stop includes an essentially rigid bracket (9) intended to be supportingly arranged adjacent the load. A fastening portion (11) is also provided for mounting the load stop to the load carrying tube. The bracket (9) is pivoted in at the fastening portion (11), wherein the load stop (1) is foldable between at least a raised working position and a folded transporting position.

15 Claims, 4 Drawing Sheets

LOAD STOP FOR SUPPORTING A LOAD ON A LOAD CARRIER

RELATED CASES

This application is a continuation of International Patent Application Ser. No. PCT/SE2007/000613 filed Jun. 26, 2007, titled LOAD STOP FOR SUPPORTING A LOAD ON A LOAD CARRIER, which claims priority to Swedish Patent Application Ser. No. 0601452 filed Jun. 30, 2006. Said applications are expressly incorporated herein by reference in their entirety.

BACKGROUND

The present invention refers to a load stop for supporting a load being transported on a load carrier or similar arrangement mounted on a vehicle. The load carrier comprises at least one load carrying tube having at least one groove for fastening the load stop at the load carrying tube. The load stop comprises an essentially rigid bracket configured to be supportingly arranged adjacent the load. The load stop also includes a fastening portion for mounting the load stop at the load carrying tube and the bracket is pivotable in at the fastening portion such that the load stop is foldable between at least a raised working position and a folded transporting position.

A load stop is described in WO 2004/094194 and discloses a load stop or a fastening block provided with a lower fastening element intended to be introduced into a C-shaped groove of a roof rack, roof rail or the like. A handle shaped upper part abuts the upper side of the roof rack and is firmly tightened thereagainst by aid of a tightening means which extends down to the fastening element. The load stop has one or more openings which can be used as a lug for a rope or a clamping strap or the like.

A problem with a load stop of this known type is that it must be located in the right position for the intended load. The load stop often becomes an obstruction and must be dismantled before the roof rack can be utilized for other types of loads. This can be time-consuming for the craftsman and other workers who alternatingly transport, for example ladders, pipes, building boards, battens and the like on the roof rack.

SUMMARY

A purpose of the present invention is to achieve a load stop which can easily be placed in the right working position along a load carrying tube and be fixed in that position. An additional purpose is to achieve a load stop which can, in a simple way, be moved away and located in a transporting position.

This is achieved by the present invention with a load stop of the type introduced above and which is characterized in that the load carrying tube has at least one side arranged with a C-shaped groove in which the fastening portion of the load stop is mounted and the load stop, in a down folded transporting position, is below or in level with an upper surface of the load carrying tube.

BRIEF DESCRIPTION OF THE DRAWINGS

A load stop according to the present invention will hereafter be described in greater detail with reference to the accompanying figures, in which.

DETAILED DESCRIPTION

Figure 1:
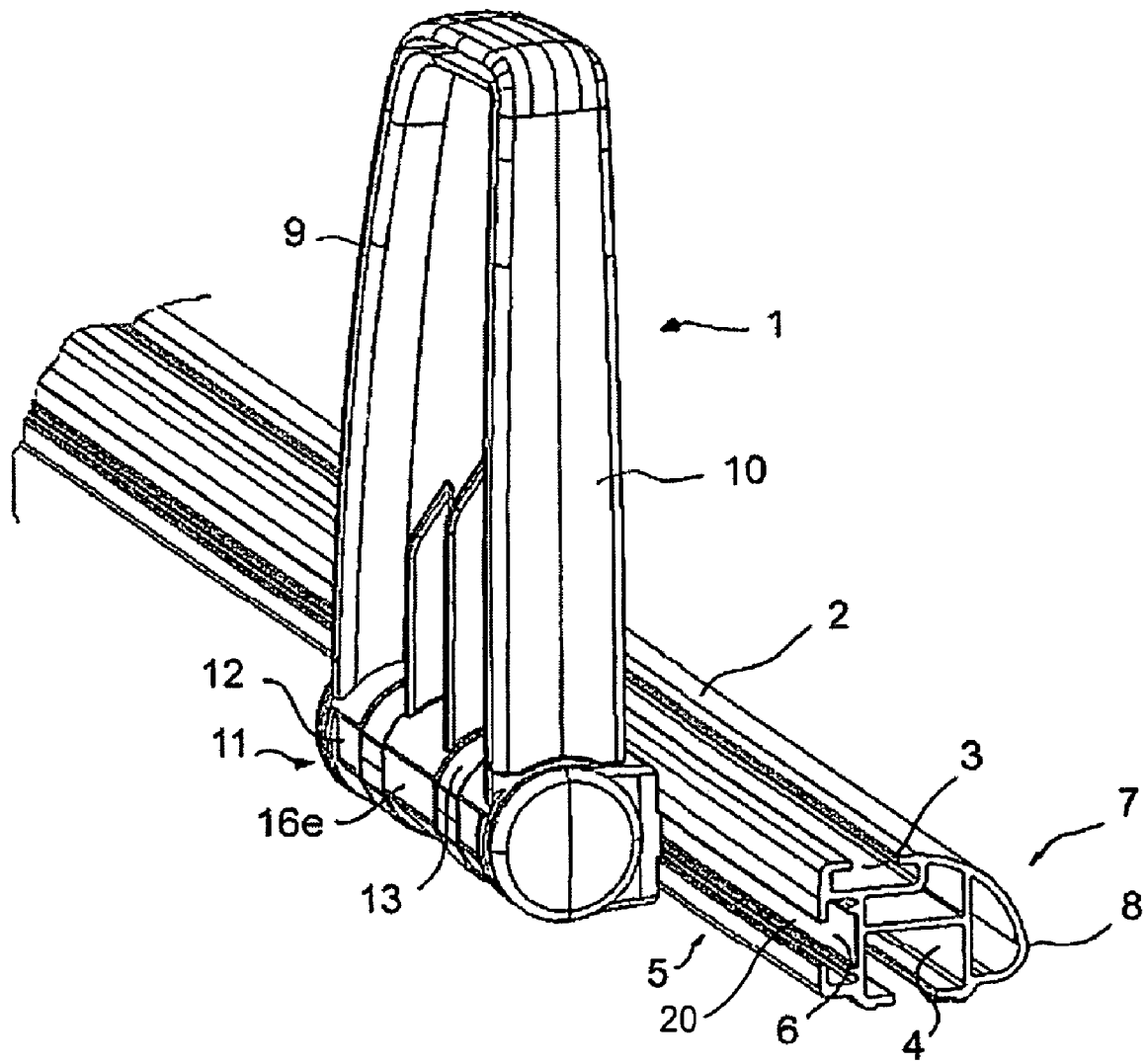
FIG. 1 is a schematic view in perspective of a load stop, according to the present invention, in a raised working position.
Figure 2:
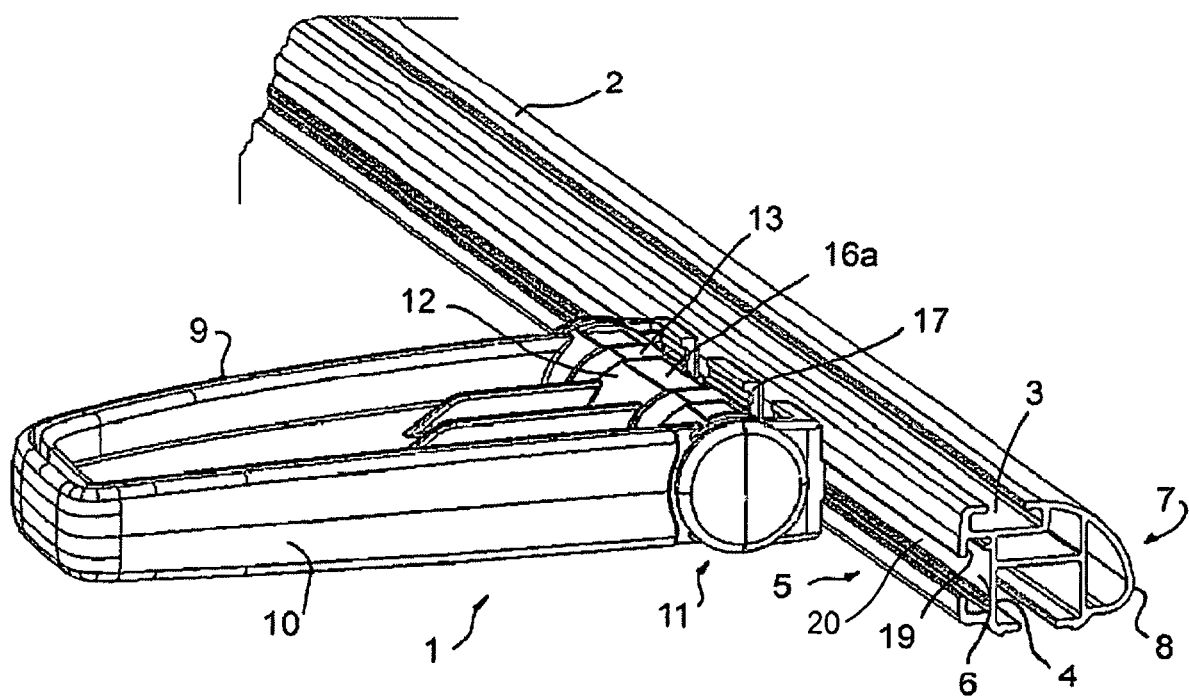
FIG. 2 is a schematic view in perspective of a load stop, according to the present invention, in a folded transporting position.
Figure 3:
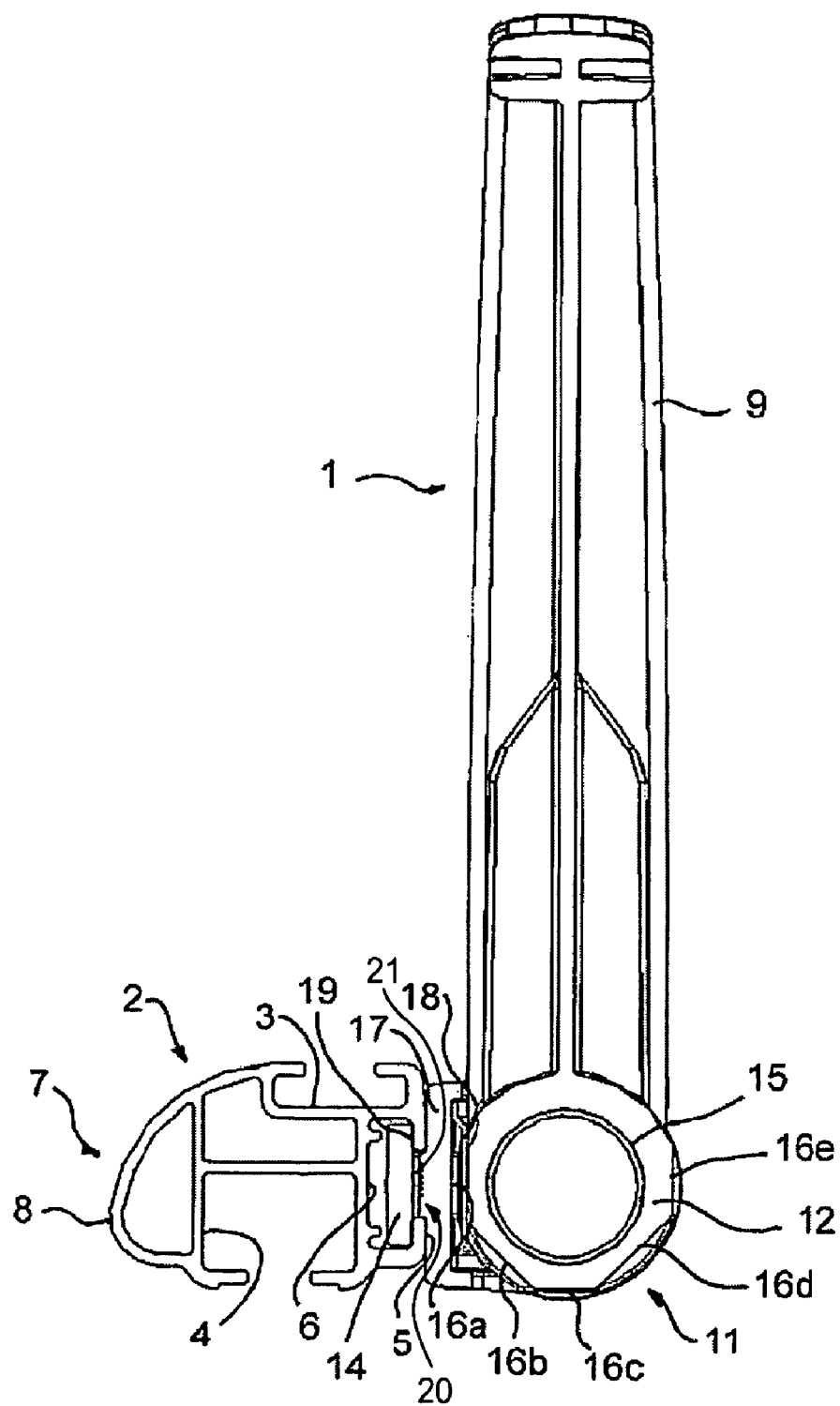
FIG. 3 is a schematic cross-section of the load stop configured according to FIG. 2.
Figure 4:
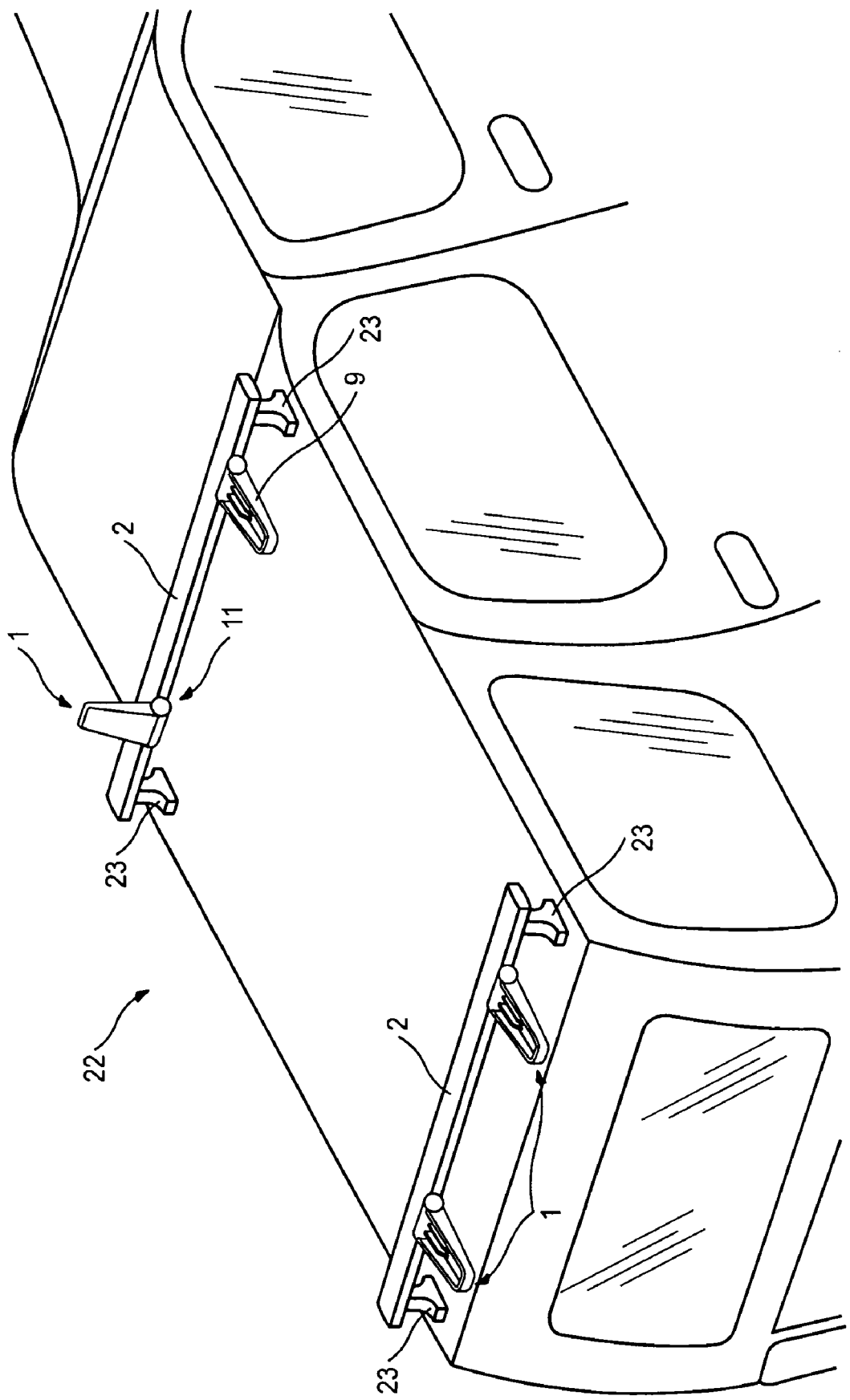
FIG. 4 is a perspective view of four load stop arrangements installed on two load carrying tubes mounted on feet to a vehicle roof.

In FIGS. 1 to 3, a load stop arrangement 1 positioned upon a load carrying tube 2 is shown. The load stop 1 is preferably made of a plastic material, but can also be made of metal. A load carrying tube 2 extends generally between two load carrier feet 23 crosswise over a roof of a vehicle 22 or a truck bed as depicted in FIG. 4. The load carrier feet can in a known manner be fixed at the vehicle or at an existing roof rail of the vehicle. The load carrying tube 2 can be made of aluminium and have an essentially C-shaped groove or receiver 6 for the mounting of accessories thereto by being fastened at the load carrying tube 2 with the aid of a bolt 21. The extension bolt 21 extends through the access slot 20 into the groove 6 and has a rectangular head which can be moved in said groove 6.

The load carrying tube 2 of the present invention comprises, in addition to an upper C-shaped groove 3 and a lower C-shaped groove 4 used for anchoring the load carrying tube, at least one C-shaped groove 6 arranged at a rear facing side 5 of the load carrying tube 2. The other forward facing side 7 of the load carrying tube 2 has an arched surface 8 intended to be orientated forward in the direction of the vehicle to reduce air resistance. Naturally, the load carrying tube 2 may also be designed symmetrically with a C-shaped groove arranged at all sides. It would also be possible to arrange several parallel grooves at least in one side of the tube 2.

The load stop 1 according to the present invention comprises an essentially rigid plate shaped elongate bracket 9, with one of its side edges 10 arranged against a load (not shown) on the load carrying tube 2 in order to support the load and prevent displacement of the load. A base fastening portion 11 is provided which is intended to be moved into the right position in the C-shaped groove 6 and fix the load stop 1 along the load carrying tube 2.

The fastening portion 11 is pivoted in the plate shaped bracket 9. The bracket 9 as shown in the preferred embodiment has a first at least partly tubular portion 12 that is firmly attached with the bracket 9. The fastening portion 11 further comprises a corresponding second at least partly tubular portion 13. The fastening portion 11 is also firmly attached with a fastening plate 14 that fastens the load stop 1 with the groove 6 in the load carrying tube 2. The tubular portions 12 and 13 are forked or spaced apart relative to each other and a common axle 15 extends through the tubular portions 12 and 13. The tubular portions 12 and 13 are fixed relative to each other in an axial direction, but a twisting of the tubular portions 12 and 13 around the axle 15 is admitted. Preferably, the axle 15 is made of metal. Naturally, the axle 15 may be replaced by designing the tubular portions 12 and 13 in known manner, with one bayonet joint or snap-in closure. The meaning of the expression forked is that the portions 12 and 13 alternatingly extend around the axle 15 along the axial direction. Naturally, the portions may be designed similar to other known hinges.

As disclosed, the partly tubular portion 12 has at least one essentially flat peripherally external supporting surface 16a-e which are each located at a radial distance, measured perpendicularly to the respective surface 16a-e, from the center of the axle 15. The distance is chosen such that the external supporting surface 16a-e is at least partly abutting the load carrying tube 2 or, as shown in FIG. 3, against a resilient pressure plate 17 located between the load carrying tube 2 and the bracket 9. Furthermore, a spring 18 may also be included adjacent the pressure plate 17. The external supporting surface 16a-e will thus act as an eccentric pressing the load stop 1 in a direction out from the load carrying tube 2 and whereby the fastening plate 14 is brought into engagement with the outer wall 19 of the C-shaped groove 6 in order to clamp the load stop 1 firmly against the load carrying tube 2. By providing the tubular portion 12 with several symmetrically placed flat external support surfaces 16a-16e located at different radial distances from the center of the axle 15 as shown in FIG. 3, different clamping forces can be achieved.

In the illustrated embodiment five different external support surfaces 16a-e are shown, but naturally, any number can be chosen within the frame of the present claims. In the case that the external supporting surface 16c is abutting the pressure plate 17, the position shown in FIG. 2 is achieved wherein the load stop 1 lies folded or pivoted down into a fixed position parallel with the roof of the vehicle. This position is a transporting position or configuration in which the load stop 1 is not an obstruction to anything being loaded. From this position the load stop may be turned 45° upwards or downwards, thereby causing the external supporting surface 16b or 16d to be directed toward the pressure plate 17. In these positions the load stop 1 is released and may thus be pushed along the groove 6. By turning the load stop 1 a further 45° either the external supporting surface 16a or 16e will abut against the pressure plate 17. These external support surfaces lie at the largest radial distance from the center of the axle 15 and fasten the load stop 1 in a raised position as illustrated in FIGS. 1 and 3. In this position the load stop 1 is intended to abut against the material to be retained and is dimensioned to withstand the intended weight.

Naturally, the load stop 1 may also be mounted in the upper groove 3, wherein the external supporting surface 16c is dimensioned to be on the largest radial distance from the center of the axle 15. In an alternative embodiment, the tubular portion 12 can be arranged turnable connected relatively to the bracket 9. However, mounting the load stop 1 in the upper groove 3 has less advantage compared to the preferred embodiment in which the load stop 1 is mounted in the receiver or groove 6 on the rear side 5 of the load carrying tube 2.

Finally, the tubular portions 12 and 13 can be arranged resiliently movable relative to each other along the axle 15 and can be provided with gripping means (not shown) to lock the tubular portions relative to each other and wherein a displacement against the force of the spring will release the gripping means from each other and permit the turning of the tubular portions 12 and 13 relative each other around the axle.

The invention claimed is:
1. A load stop arrangement for laterally restraining a load being carried on an elevated load carrying tube mounted on a vehicle, said load stop arrangement comprising:
   a receiver on a load carrying tube mountable on a vehicle;
   an elongate bracket coupled by a pivotable interconnection to a base fastening portion configured for securement to the receiver on the load carrying tube, wherein said elongate bracket is transitionable between a working configuration and a transporting configuration by pivotation of said pivotable interconnection,
   wherein said receiver is defined by a C-shaped channel having an access slot exposed at a rear facing surface of said load carrying tube;
   said pivotable interconnection extending said elongate bracket in a substantially horizontal orientation at an elevation not greater than an elevation of said base fastening portion in said transporting configuration; and
   said pivotable interconnection further comprising:
      a pair of spaced apart partly tubular portions of said elongate bracket configured for receiving an axle of said fastening portion therein, wherein each of said pair of spaced apart partly tubular portions is interiorly cylindrical shaped;
      an axle of said fastening portion rotatably received in said pair of spaced apart partly tubular portions and thereby accommodating pivotable transition of said load stop arrangement between said working configuration and said transporting configuration; and
      an exterior periphery of each of said pair of spaced apart partly tubular portions comprising at least two flat surfaces, one of said flat surfaces being at a first perpendicular radial distance from said axle and a second of said flat surfaces being at a second greater perpendicular radial distance from said axle, said base fastening portion assuming a laterally fixed configuration relative said load carrying tube when said second of said flat surfaces is facing toward said rear facing surface of said load carrying tube and said base fastening portion assuming a laterally moveable configuration relative said load carrying tube when said first of said flat surfaces is facing toward said rear facing surface of said load carrying tube.

2. The load stop arrangement as recited in claim 1, wherein said elongate bracket is essentially level with said base fastening portion in said transporting configuration.

3. The load stop arrangement as recited in claim 1, further comprising:
   a fastening plate located in said receiver and interconnected with said base fastening portion by an extension extending through said access slot.

4. The load stop arrangement as recited in claim 1, wherein a long axis of said elongate bracket is substantially horizontally oriented in the laterally fixed configuration.

5. The load stop arrangement as recited in claim 1, wherein a long axis of said elongate bracket is substantially vertically oriented in the laterally fixed configuration.

6. The load stop arrangement as recited in claim 1, wherein a long axis of said elongate bracket is oriented at a substantially forty-five degree angle relative to horizontal in the laterally moveable configuration.

7. The load stop arrangement as recited in claim 1, wherein said at least two flat surfaces respectively directly abut said rear facing surface of said load carrying tube in said laterally fixed configuration and said laterally moveable configuration.

8. The load stop arrangement as recited in claim 1, wherein each of said pair of spaced apart partly tubular portions of said elongate bracket is fixed relative the other.

9. The load stop arrangement as recited in claim 1, wherein each of said pair of spaced apart partly tubular portions of said elongate bracket is moveable relative the other thereby permitting variable spacing distances therebetween.

10. The load stop arrangement as recited in claim 1, wherein said load carrying tube is mounted on the vehicle in crosswise direction with respect to a long axis of the vehicle.

11. The load stop arrangement as recited in claim 1, further comprising:
   the elevated load carrying tube mountable on a vehicle in an installed configuration in which a long axis of said load carrying tube is essentially horizontally oriented with respect to a long axis of the vehicle and has a forward facing surface opposite to said rear facing surface, said receiver for the base fastening portion being located at said rear facing surface with said base fastening portion secured therein; and said elongate bracket and said base fastening portion being located at an elevation not greater than an elevation of said elevated load carrying tube in said transporting configuration.

12. The load stop arrangement as recited in claim 11, wherein said forward facing surface is arch-shaped for reduced air resistance.

13. The load stop arrangement as recited in claim 1, further comprising a pressure plate respectively interposed between said at least two flat surfaces and said rear facing surface of said load carrying tube in said laterally fixed configuration and said laterally moveable configuration.

14. The load stop arrangement as recited in claim 13, further comprising a spring respectively interposed between said at least two flat surfaces and said pressure plate in said laterally fixed configuration and said laterally moveable configuration.

15. A vehicle having a load stop arrangement that laterally restrains a load on an elevated load carrying tube mounted on the vehicle, said vehicle comprising:

an elevated load carrying tube mounted on the vehicle in an installed configuration in which a long axis of said load carrying tube is essentially horizontally oriented with respect to a long axis of the vehicle and has a forward fixing surface and a rear facing surface;

said elevated load carrying tube comprising a receiver located at said rear facing surface;

a load stop arrangement comprising an elongate bracket coupled by a pivotable interconnection to a base fastening portion configured for securement to the receiver, wherein said elongate bracket is transitionable between a working configuration and a transporting configuration by pivotation of said pivotable interconnection, wherein said receiver is defined by a C-shaped channel having an access slot exposed at said rear facing surface of said load carrying tube, said rear facing surface oriented to face one of a front end or a rear end of the vehicle; and said pivotable interconnection extending said elongate bracket in a substantially horizontal orientation at an elevation not greater than an elevation of said base fastening portion in said transporting configuration; and wherein said pivotable interconnection further comprises:

a pair of spaced apart partly tubular portions of said elongate bracket configured for receiving an axle of said fastening portion therein, wherein each of said pair of spaced apart partly tubular portions is interiorly cylindrical shaped;

an axle of said fastening portion rotatable received in said pair of spaced apart partly tubular portions and thereby accommodating pivotable transition of said load stop arrangement between said working configuration and said transporting configuration; and an exterior periphery of each of said pair of spaced apart partly tubular portions comprising at least two flat surfaces, one of said flat surfaces being at a first perpendicular radial distance from said axle and a second of said flat surfaces being at a second greater perpendicular radial distance from said axle, said base fastening portion assuming a laterally fixed configuration relative said load carrying tube when said second of said flat surfaces is facing toward said rear facing surface of said load carrying tube and said base fastening portion assuming a laterally moveably configuration relative said load carrying tube when said first of said flat surfaces is facing toward said rear facing surface of said load carrying tube.

\* \* \* \* \*